(12) United States Patent
Harres (10) Patent No.: US 8,478,126 B1
(45) Date of Patent: Jul. 2, 2013

(54) PHASE LOCK LOOP FOR OPTICAL WIRELESS NETWORK

(75) Inventor: Daniel N. Harres, Belleville, IL (US)

(73) Assignee: The Boeing Company, Chicago, IL (US)

( * ) Notice: Subject to any disclaimer, the term of this patent is extended or adjusted under 35 U.S.C. 154(b) by 347 days.

(21) Appl. No.: 12/707,761

(22) Filed: Feb. 18, 2010

(51) Int. Cl.
*H04J 14/08* (2006.01)
*H04B 10/00* (2006.01)

(52) U.S. Cl.
USPC ............ 398/103; 398/118; 398/127; 398/130

(58) Field of Classification Search
None
See application file for complete search history.

(56) References Cited

U.S. PATENT DOCUMENTS

| | | | |
|---|---|---|---|
| 4,882,770 A * | 11/1989 | Miyahira et al. | 398/76 |
| 4,896,334 A * | 1/1990 | Sayar | 375/293 |
| 5,459,432 A * | 10/1995 | White et al. | 329/307 |
| 5,552,780 A | 9/1996 | Knockeart | |
| 5,727,038 A * | 3/1998 | May et al. | 375/376 |
| 5,740,366 A | 4/1998 | Mahany et al. | |
| 5,790,952 A | 8/1998 | Seazholtz et al. | |
| 6,011,784 A | 1/2000 | Brown et al. | |
| 6,028,853 A | 2/2000 | Haartsen | |
| 6,665,311 B2 | 12/2003 | Kondylis et al. | |
| 6,894,975 B1 | 5/2005 | Partyka | |
| 2002/0044325 A1 * | 4/2002 | Noguti | 359/189 |

OTHER PUBLICATIONS

"A Technical Tutorial on Digital Signal Synthesis", Analog Devices Inc. , 1999, pp. 1-122.

* cited by examiner

*Primary Examiner* — Kenneth N Vanderpuye
*Assistant Examiner* — Darren E Wolf
(74) *Attorney, Agent, or Firm* — Yee & Associates, P.C.

(57) ABSTRACT

An apparatus comprises a platform, an optical transmitter associated with the platform, an optical detector associated with the platform, a sensor associated with the platform, a phase-locked loop circuit, and a processor unit associated with the platform. The optical transmitter is configured to transmit first optical signals. The optical detector is configured to receive optical signals. The phase-locked loop circuit is configured to indicate a presence of second optical signals in the optical signals indicating a time interval to transmit information in the first optical signals. The processor unit is electrically connected to the optical detector, the optical transmitter, and the sensor. The processor unit is associated with the phase-locked loop circuit. The processor unit is configured to transmit the information in the first optical signals using the optical transmitter during the time interval.

18 Claims, 6 Drawing Sheets

PHASE LOCK LOOP FOR OPTICAL WIRELESS NETWORK

BACKGROUND INFORMATION

1. Field

The present disclosure relates generally to optical signals and, in particular, to the transmission of optical signals. Still more particularly, the present disclosure relates to controlling the transmission of optical signals in an optical communications system.

2. Background

Optical signals are electromagnetic waves in one of the ultraviolet spectrum, visible light spectrum, or infrared spectrum. Optical signals in the ultraviolet spectrum have wavelengths from about 10 nanometers to about 400 nanometers. Optical signals in the visible light spectrum have wavelengths from about 400 to about 750 nanometers. Optical signals in the infrared spectrum have wavelengths from about 750 nanometers to about 300 micrometers.

Optical signals are transmitted between devices in an optical communications system. An optical communications system includes sources, receivers, and media. The sources transmit the optical signals to the receivers through media.

The sources may include optical transmitters, such as light emitting diodes, laser diodes, and other suitable optical transmitters. The receivers may include optical receivers, such as optical detectors and other suitable types of optical receivers. These may include, for example, air, a vacuum, fiber optic cables, optical wires, and/or other suitable types of channels for transmitting optical signals. When the media is air, the optical communications system is a wireless optical communications system.

Wirelessly transmitting optical signals from an optical transmitter to a receiver may depend on having a line of sight between the optical transmitter and the receiver. A line of sight is a path without any objects in the media between the optical transmitter and the receiver. Objects in the media may cause the receiver to operate as if the optical signals received at the optical receiver contain information that is not actually present. Further, objects in the media may cause the receiver to not receive some or all of the information in the optical signals received.

A line of sight may not be needed if repeaters are used. These repeaters may be optical-electro-optical (OEO) repeaters. An optical-electro-optical repeater receives an optical signal, converts it into an electrical signal, and then transmits an optical signal.

Wireless optical communications systems provide an alternative to using radio frequency (RF) wireless networks for communications. Radio frequency signals have frequencies between about 30 megahertz and about 300 gigahertz. Radio frequency wireless networks have a potential for radio frequency interference, radio frequency jamming, and other types of disruptions to communications. Further, radio frequency signals are more easily detected than optical signals.

However, optical signals may have a greater rate of attenuation as compared to radio frequency signals. Attenuation is the rate at which an optical signal is reduced in intensity as it propagates through a medium.

Therefore, it would be desirable to have a method and apparatus that may overcome one or more of the issues described above, as well as other possible issues.

SUMMARY

In one advantageous embodiment, an apparatus comprises a platform, an optical transmitter associated with the platform, an optical detector associated with the platform, a sensor associated with the platform, a phase-locked loop circuit, and a processor unit associated with the platform. The optical transmitter is configured to transmit first optical signals. The optical detector is configured to receive optical signals. The phase-locked loop circuit is configured to indicate a presence of second optical signals in the optical signals indicating a time interval to transmit information in the first optical signals. The processor unit is electrically connected to the optical detector, the optical transmitter, and the sensor. The processor unit is associated with the phase-locked loop circuit. The processor unit is configured to transmit the information in the first optical signals using the optical transmitter during the time interval.

In another advantageous embodiment, an apparatus comprises a number of sensor units and a receiver system. A sensor unit within the number of sensor units comprises a platform, a first processor unit, a first optical detector configured to receive optical signals, a first optical transmitter configured to transmit first optical signals, and a sensor. The receiver system comprises a second platform, a second processor unit, a second optical detector, and a second optical transmitter. The receiver system is configured to transmit second optical signals identifying a time interval during which information is transmitted by the number of sensor units and to receive the information in the first optical signals from the number of sensor units.

In yet another advantageous embodiment, a method is present for transmitting information. Optical signals are received at an optical detector in a sensor unit. The sensor unit comprises a platform, an optical transmitter associated with the platform and configured to transmit the information in first optical signals, a sensor associated with the platform, a phase-locked loop circuit, and a processor unit associated with the platform. The processor unit is electrically connected to the optical detector, the optical transmitter, and the sensor. The processor unit is associated with the phase-locked loop circuit. The phase-locked loop circuit is configured to indicate a presence of second optical signals in the optical signals indicating a time interval to transmit the information. Information is transmitted in the first optical signals using the optical transmitter during the time interval in response to an indication of the presence of the second optical signals.

The features, functions, and advantages can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the advantageous embodiments are set forth in the appended claims. The advantageous embodiments, however, as well as a preferred mode of use, further objectives, and advantages thereof, will best be understood by reference to the following detailed description of an advantageous embodiment of the present disclosure when read in conjunction with the accompanying drawings, wherein:

DETAILED DESCRIPTION

The different advantageous embodiments recognize and take into account a number of different considerations. For example, the different advantageous embodiments recognize and take into account that optical communications systems may be used in a number of applications, such as, for example, satellite systems, factories, and other suitable applications. For example, a satellite may have an optical communications system that is wireless. This type of wireless communications system reduces a weight of the satellite system and the number of components needed for the satellite system. Still further, these types of sensor units may require less power than other types of sensor units.

The different advantageous embodiments also recognize and take into account that the networking of an array of sensor units with optical transmitters configured to transmit optical signals requires power. One solution for networking the array of sensor units while reducing the power used is to assign each optical transmitter a predetermined time for transmitting optical signals. These predetermined times may be within a particular period of time. For example, each optical transmitter may transmit optical signals at a different 10 millisecond interval within about a one second period of time.

The different advantageous embodiments recognize and take into account that with this type of configuration, only one optical transmitter may transmit optical signals at any given time. In other words, the timing of the transmissions of the optical transmitters may be such that the transmissions do not overlap each other. The different advantageous embodiments recognize and take into account that sending out an optical signal from a receiver system to indicate the beginning of a new time frame may decrease timing inconsistencies for the transmissions. This optical signal may be referred to as a beacon optical signal.

Further, the different advantageous embodiments also recognize and take into account that movement in the field of view of an optical detector in a sensor unit may cause the timing for the transmission to change. For example, a beacon optical signal is selected to have a frequency of about one hertz. Movement of a person may cause ambient light in the area around the optical transmitter to be reflected from the person. This type of movement can produce light reflections with a frequency of about one hertz. The optical detector may detect this frequency. This detection may alter the predetermined timing for transmission of optical signals.

Thus, the different advantageous embodiments provide a method and apparatus for transmitting information in an optical communications network. In one advantageous embodiment, an apparatus comprises a platform, an optical transmitter associated with the platform, an optical detector associated with the platform, a sensor associated with the platform, a phase-locked loop circuit, and a processor unit associated with the platform.

The optical transmitter is configured to transmit first optical signals. The optical detector is configured to receive optical signals. The phase-locked loop circuit is configured to indicate a presence of second optical signals in the optical signals indicating a time interval to transmit information in the first optical signals. The processor unit is electrically connected to the optical detector, the optical transmitter, and the sensor and is associated with the phase-locked loop circuit. The processor unit is configured to transmit the information in the first optical signals using the optical transmitter during the time interval.

Figure 1:
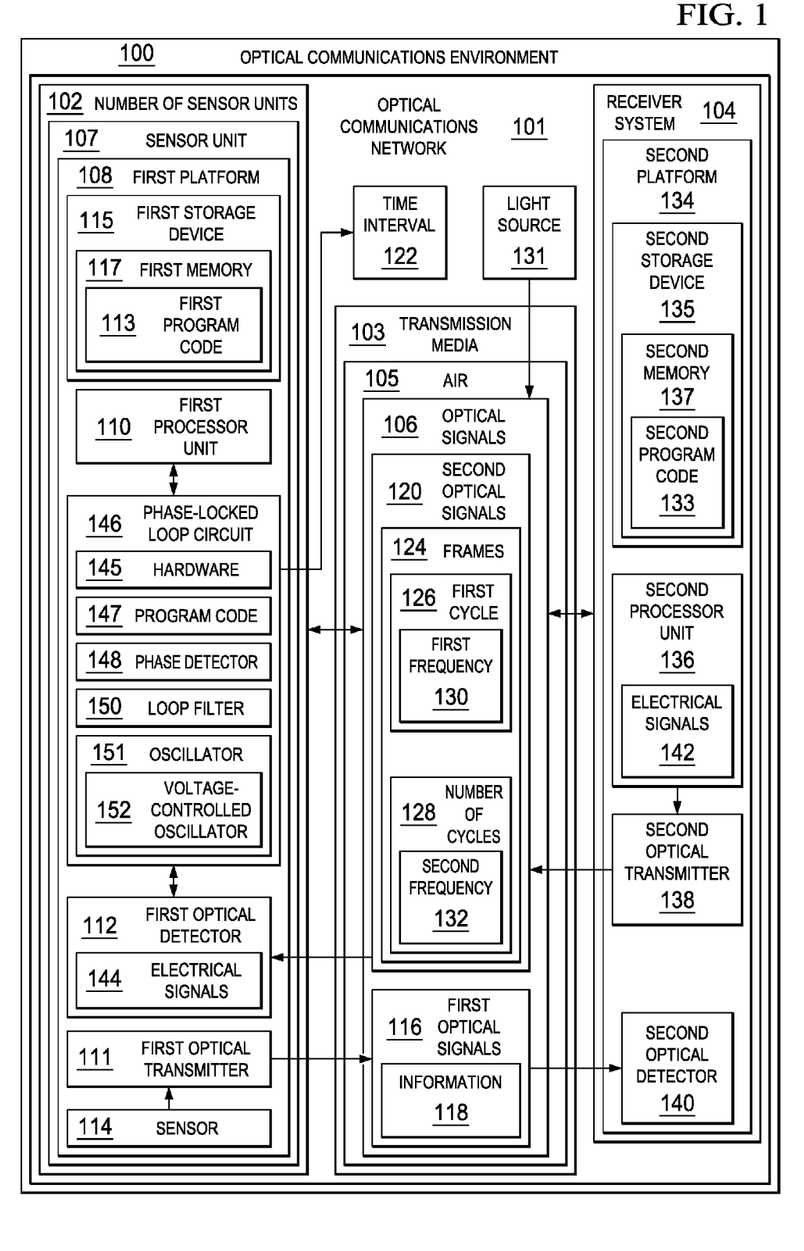
FIG. 1 is an illustration of a block diagram of an optical communications environment in accordance with an advantageous embodiment.

With reference now to FIG. 1, an illustration of a block diagram of an optical communications environment is depicted in accordance with an advantageous embodiment. In these illustrative examples, optical communications environment 100 includes optical communications network 101. Optical communications network 101 is a wireless network in these examples. Optical communications network 101 includes number of sensor units 102, transmission media 103, and receiver system 104. Transmission media 103 is air 105 in these examples.

In these illustrative examples, optical signals 106 are transmitted within optical communications network 101 between number of sensor units 102 and receiver system 104 through air 105. Optical signals 106 are electromagnetic waves with wavelengths between about 10 nanometers and about 0.7 micrometers. In other words, optical signals 106 may be electromagnetic waves in the ultraviolet spectrum, the visible light spectrum, or the infrared spectrum.

Sensor unit 107 is an example of a sensor unit in number of sensor units 102. Sensor unit 107 is comprised of first platform 108, first processor unit 110, first optical transmitter 111, first optical detector 112, and sensor 114. First processor unit 110, first optical transmitter 111, first optical detector 112, and sensor 114 are associated with first platform 108.

A first component may be considered to be associated with a second component by being secured to the second component, bonded to the second component, fastened to the second component, and/or connected to the second component in some other suitable manner. The first component also may be connected to the second component by a third component. The first component also may be considered to be associated with the second component by being part of and/or an extension of the second component.

In these depicted examples, first processor unit 110 is electrically connected to first optical transmitter 111, first optical detector 112, and sensor 114 on first platform 108. First processor unit 110 may be a set of one or more processors or may be a multi-processor core, depending on the particular implementation. Further, first processor unit 110 may be implemented using one or more heterogeneous processor systems in which a main processor is present with secondary processors on a single chip. As another illustrative example, first processor unit 110 may be a symmetric multi-processor system containing multiple processors of the same type.

First processor unit 110 is configured to run first program code 113 stored in first storage device 115. A storage device is any piece of hardware that is capable of storing information, such as, for example, without limitation, data, program code in functional form, and/or other suitable information either on a temporary basis and/or a permanent basis. First storage device 115 takes the form of first memory 117 in these illustrative examples. First memory 117, in these examples, may be, for example, a random access memory or any other suitable volatile or non-volatile storage device.

Sensor 114 is a device that measures a physical quantity and generates a signal representing the physical quantity. For example, sensor 114 may be selected from one of a temperature sensor, a pressure sensor, an accelerometer, a microphone, an oxygen sensor, a carbon dioxide sensor, a current sensor, a gas detector, an air flow sensor, a radiation detector, a tilt sensor, a piezoelectric sensor, and/or some other suitable type of sensor.

In these depicted examples, first optical transmitter 111 may take the form of, for example, a light emitting diode, a laser diode, or some other suitable type of optical transmitter.

First optical transmitter 111 transmits first optical signals 116 to receiver system 104. First optical signals 116 contain information 118. Information 118 is for the physical quantity measured by sensor 114. For example, without limitation, information 118 may include a temperature, a pressure, an acceleration, an oxygen level, a carbon dioxide level, a current level, an indication of a type of gas, an air flow level, a radiation level, a tilt level, and/or other suitable information.

First optical detector 112 is configured to receive optical signals 106. A portion of optical signals 106 received at first optical detector 112 is second optical signals 120. Another portion of optical signals 106 received at first optical detector 112 is transmitted by light source 131. Light source 131 may be, for example, sunlight, a lamp, a fire, or some other suitable light source.

Second optical signals 120 are transmitted to first optical detector 112 by receiver system 104. Receiver system 104 is comprised of second platform 134, second processor unit 136, second optical transmitter 138, and second optical detector 140. Second processor unit 136, second optical transmitter 138, and second optical detector 140 are associated with second platform 134. Further, second optical transmitter 138 and second optical detector 140 are electrically connected to second processor unit 136.

Second processor unit 136 is configured to run second program code 133 stored in second storage device 135 in the form of second memory 137. Second processor unit 136 in receiver system 104 generates electrical signals 142. Second optical transmitter 138 changes electrical signals 142 to second optical signals 120. Further, second optical transmitter 138 transmits second optical signals 120 to number of sensor units 102.

Second optical signals 120 take the form of sine waves in these illustrative examples. Second optical signals 120 are comprised of frames 124. Each frame in frames 124 contains first cycle 126 and number of cycles 128. First cycle 126 has first frequency 130, and number of cycles 128 has second frequency 132.

In these illustrative examples, first frequency 130 and second frequency 132 are selected such that second frequency 132 is a multiple of first frequency 130. In other words, first frequency 130 is a submultiple of second frequency 132. A submultiple is a number that can be divided into another number an integral number of times without a remainder.

For example, first frequency 130 is selected as about 15 hertz, and second frequency 132 is selected as about 30 hertz. Further, number of cycles 128 is about 28 cycles in these examples. In this manner, first cycle 126 and number of cycles 128 are about one second long. Of course, in other advantageous embodiments, other frequencies and numbers of cycles may be used for frames 124.

First optical detector 112 in sensor unit 107 receives second optical signals 120 and changes second optical signals 120 to electrical signals 144. Electrical signals 144 are sent to phase-locked loop circuit 146. In these illustrative examples, phase-locked loop circuit 146 is associated with first optical detector 112 and first processor unit 110. Further, phase-locked loop circuit 146 may be implemented in hardware, software, or a combination of both hardware and software.

For example, one portion of phase-locked loop circuit 146 may be hardware 145 electrically connecting phase-locked loop circuit 146 to first optical detector 112. Another portion of phase-locked loop circuit 146 may be program code 147 running on first processor unit 110.

In these illustrative examples, phase-locked loop circuit 146 includes phase detector 148, loop filter 150, and oscillator 151. Phase detector 148 may be implemented in hardware 145 and/or program code 147 running on first processor unit 110. Loop filter 150 and oscillator 151 are implemented in program code 147 in these examples.

Phase detector 148 has an input connected to first optical detector 112. Phase detector 148 receives electrical signals 144 through this input. Phase detector 148 may take the form of a multiplying digital-to-analog converter. The output of phase detector 148 is connected to the input of loop filter 150. The output of loop filter 150 is connected to the input of oscillator 151.

Further, the output of oscillator 151 is connected to an input of phase detector 148. In this manner, phase detector 148 has the output of oscillator 151 and electrical signals 144 as inputs.

In these depicted examples, oscillator 151 has a phase and frequency that is controlled by a number of parameters. These parameters may be, for example, without limitation, voltage, numbers, and/or other suitable parameters. In these illustrative examples, oscillator 151 takes the form of voltage-controlled oscillator 152.

Voltage-controlled oscillator 152 has a phase and frequency that is controlled by a voltage. Further, voltage-controlled oscillator 152 has a frequency selected to be substantially second frequency 132. In other words, voltage-controlled oscillator 152 has a frequency of about 30 hertz in these examples.

In these illustrative examples, phase-locked loop circuit 146 is configured to indicate a presence of second optical signals 120 in optical signals 106 received at first optical detector 112. Further, phase-locked loop circuit 146 is configured to indicate a presence of second optical signals 120 indicating time interval 122 during which first optical transmitter 111 is to transmit first optical signals 116. In some illustrative examples, time interval 122 may be substantially the same length in time as a frame in frames 124 for second optical signals 120. In other illustrative examples, time interval 122 may be the length in time for a number of frames in frames 124.

In still other illustrative examples, time interval 122 may be a length in time for some portion of a frame in frames 124. For example, two sensor units in number of sensor units 102 may transmit optical signals 106 during different time intervals within a frame.

The illustration of optical communications environment 100 in FIG. 1 is not meant to imply physical or architectural limitations to the manner in which different advantageous embodiments may be implemented. Other components in addition to and/or in place of the ones illustrated may be used. Some components may be unnecessary in some advantageous embodiments. Also, the blocks are presented to illustrate some functional components. One or more of these blocks may be combined and/or divided into different blocks when implemented in different advantageous embodiments.

For example, in some advantageous embodiments, optical communications network 101 may include more than one receiver system. The additional receiver systems may each control the transmission of optical signals from different number of sensor units 102. In other advantageous embodiments, more than one sensor may be associated with a sensor unit in number of sensor units 102. Further, each of the different sensor units may be associated with a number of optical transmitters in the sensor unit.

Further, in some advantageous embodiments, phase-locked loop circuit 146 may include additional components in addition to or in place of the ones shown. For example, oscillator 151 in phase-locked loop circuit 146 may take the form of a numerically-controlled oscillator in other advantageous embodiments.

Figure 2:
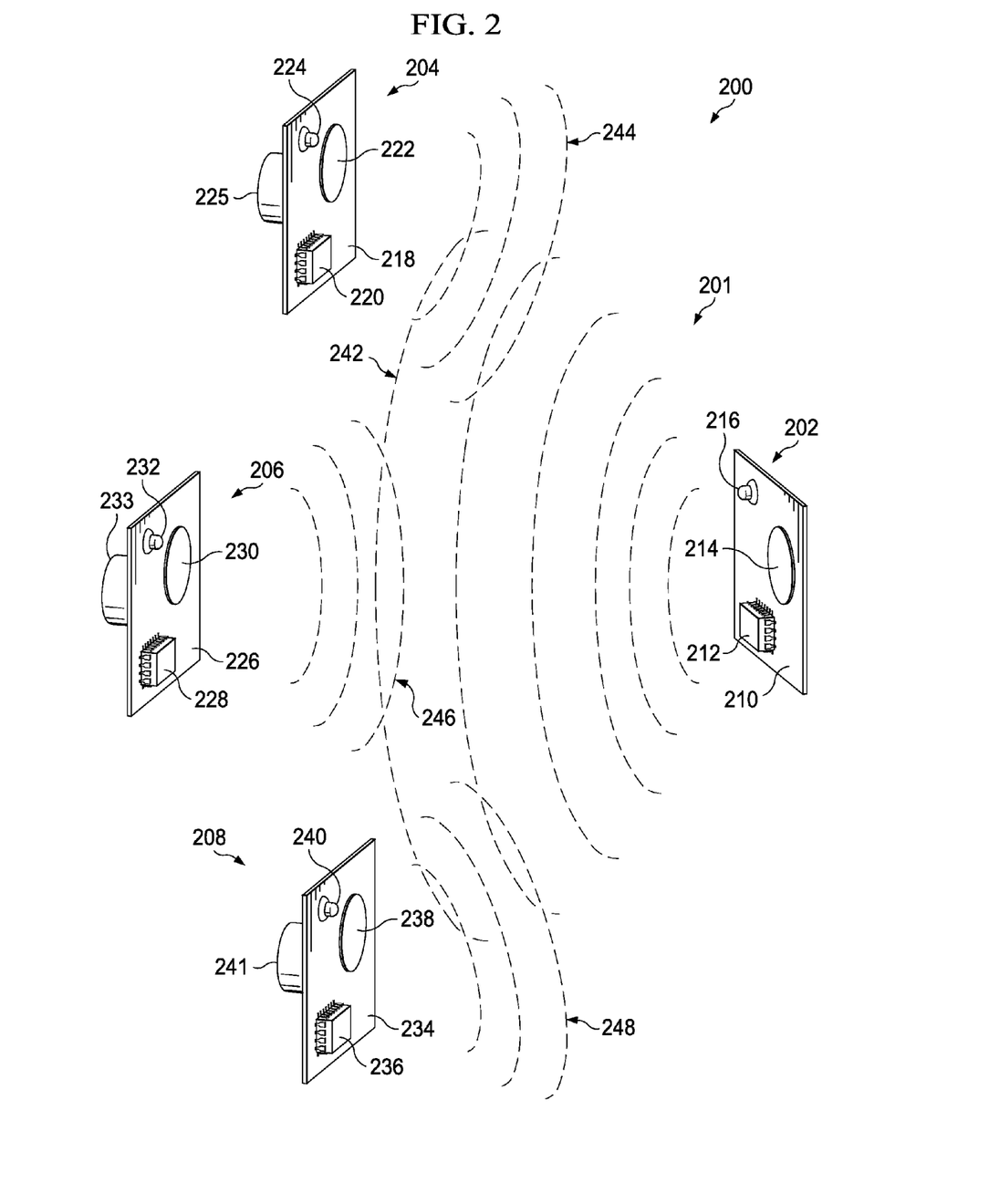
FIG. 2 is an illustration of an optical communications network in accordance with an advantageous embodiment.

With reference now to FIG. 2, an illustration of an optical communications network is depicted in accordance with an advantageous embodiment. In this illustrative example, optical communications system 200 is an example of one implementation for optical communications environment 100 in FIG. 1. Optical communications system 200 takes the form of free-space optical communications network 201 in this depicted example.

As depicted, optical communications system 200 includes receiver system 202, sensor unit 204, sensor unit 206, and sensor unit 208. Receiver system 202 includes platform 210, micro controller 212, optical detector 214, and optical transmitter 216 located on platform 210. Micro controller 212 is an example of one implementation for second processor unit 136 in FIG. 1.

Sensor unit 204 includes platform 218, micro controller 220, optical detector 222, optical transmitter 224, and temperature sensor 225 located on platform 218. Sensor unit 206 includes platform 226, micro controller 228, optical detector 230, optical transmitter 232, and temperature sensor 233 located on platform 226. Sensor unit 208 includes platform 234, micro controller 236, optical detector 238, optical transmitter 240, and temperature sensor 241 located on platform 234. Micro controllers 220, 228, and 236 are examples of implementations for first processor unit 110 in FIG. 1.

In these illustrative examples, optical transmitters 216, 224, 232, and 240 take the form of light-emitting diodes. Optical transmitter 216 in receiver system 202 transmits optical signal 242 to sensor units 204, 206, and 208. Optical detectors 222, 230, and 238 in sensor units 204, 206, and 208, respectively, receive optical signal 242.

Sensor units 204, 206, and 208 transmit optical signals 244, 246, and 248, respectively, to receiver system 202. Optical detector 214 in receiver system 202 receives optical signals 244, 246, and 248. In these illustrative examples, optical signals 244, 246, and 248 are sent at different times based on the time interval identified in optical signal 242.

Figure 3:
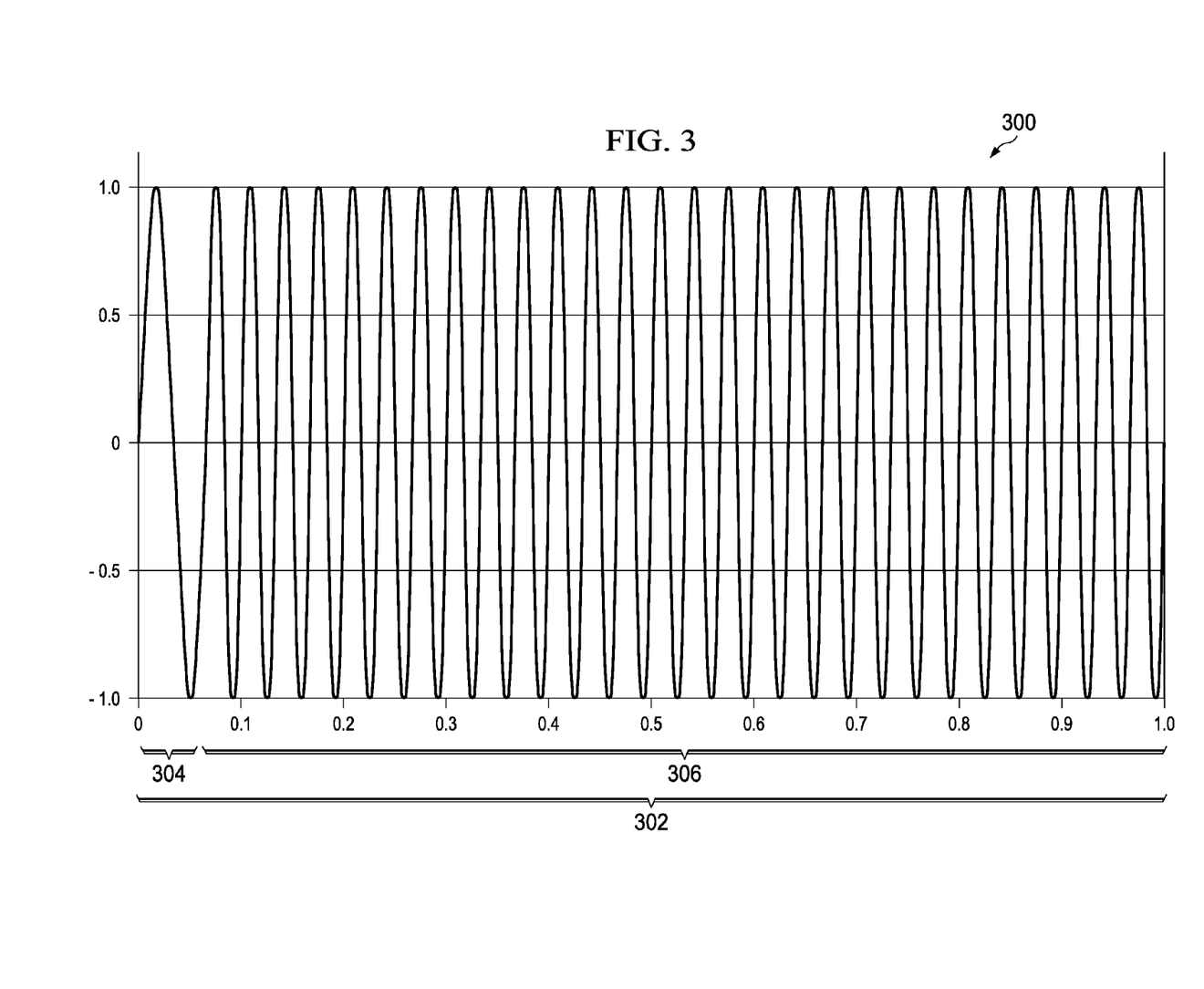
FIG. 3 is an illustration of an optical signal in accordance with an advantageous embodiment.

With reference now to FIG. 3, an illustration of an optical signal is depicted in accordance with an advantageous embodiment. In this illustrative example, optical signal 300 is an example of one implementation for second optical signals 120 transmitted by receiver system 104 in FIG. 1. More specifically, optical signal 300 is an example of one implementation for optical signal 242 transmitted by receiver system 202 in FIG. 2.

In this illustrative example, optical signal 300 is a sine wave. Optical signal 300 has frame 302. Frame 302 is about one second long. Frame 302 includes first cycle 304 and number of cycles 306. First cycle 304 has a frequency of about 15 hertz. Number of cycles 306 is about 28 cycles. These 28 cycles have a frequency of about 30 hertz.

Figure 4:
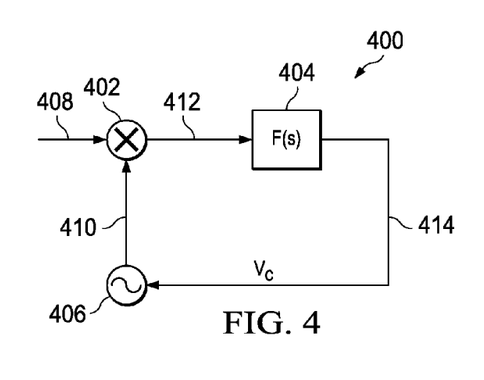
FIG. 4 is an illustration of a phase-locked loop circuit in accordance with an advantageous embodiment.

With reference now to FIG. 4, an illustration of a phase-locked loop circuit is depicted in accordance with an advantageous embodiment. In this illustrative example, phase-locked loop circuit 400 is an example of one implementation for phase-locked loop circuit 146 in sensor unit 107 in FIG. 1.

Further, phase-locked loop circuit 400 also may be associated with a processor unit and an optical detector. The processor unit may be, for example, first processor unit 110 in FIG. 1 or one of micro controllers 220, 228, or 236 in FIG. 2. The optical detector may be, for example, first optical detector 112 in FIG. 1 or one of optical detectors 222, 230, or 238 in FIG. 2.

In this illustrative example, phase-locked loop circuit 400 includes phase detector 402, loop filter 404, and voltage-controlled oscillator 406. Phase detector 402 and loop filter 404 may be directly connected to each other in this depicted example. However, phase detector 402 and loop filter 404 may be indirectly connected in other examples. Two components are directly connected when they are connected without the use of other devices. Two components are indirectly connected when they are connected through other devices.

Phase detector 402 receives signal 408 and signal 410 as inputs. Signal 408 is an electrical signal from an optical detector, such as first optical detector 112 in FIG. 1. Signal 410 is a signal from voltage-controlled oscillator 406. Signal 410 has a frequency that is selected to be substantially the same as a frequency of signal 408. Phase detector 402 is configured to determine a phase difference between signal 408 and signal 410.

The output of phase detector 402 is signal 412. Signal 412 is sent to loop filter 404. Loop filter 404 is configured to allow a range of frequencies to pass. This range of frequencies may be a range within about one hertz. For example, in these illustrative examples, loop filter 404 is configured to allow frequencies between about 29.5 hertz and about 30.5 hertz to pass.

As depicted, loop filter 404 sends filtered signal 414 to voltage-controlled oscillator 406. Signal 414 is output by loop filter 404 and is configured to cause a change in the frequency for voltage-controlled oscillator 406. This change is an increase or a decrease to bring the frequency of voltage-controlled oscillator 406 to about the same as the frequency for signal 408.

Figure 5:
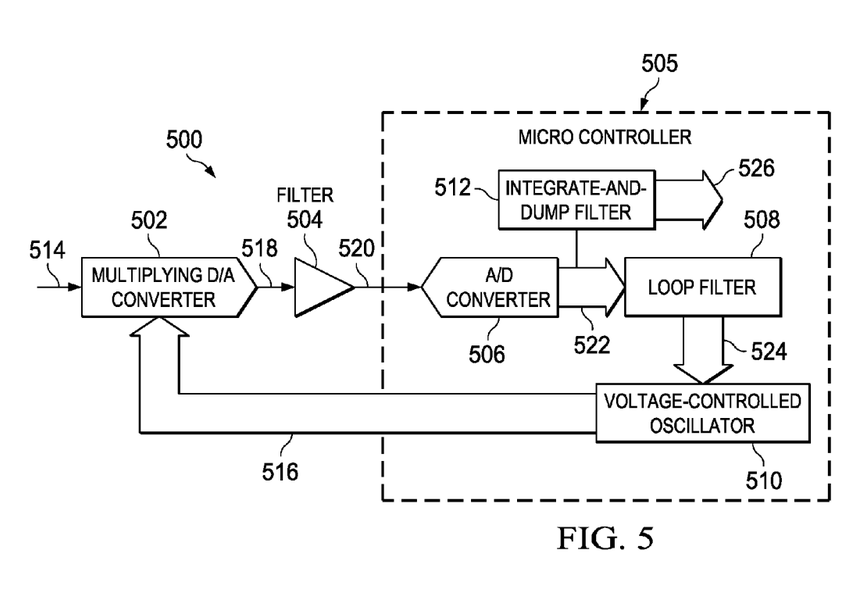
FIG. 5 is an illustration of a phase-locked loop circuit in accordance with an advantageous embodiment.

With reference now to FIG. 5, an illustration of a phase-locked loop circuit is depicted in accordance with an advantageous embodiment. In this illustrative example, phase-locked loop circuit 500 is an example of one implementation for phase-locked loop circuit 146 in FIG. 1 and phase-locked loop circuit 400 in FIG. 4.

Phase-locked loop circuit 500 may be associated with a processor unit for a sensor unit, such as first processor unit 110 for sensor unit 107 in FIG. 1. In this example, part of phase-locked loop circuit 500 is implemented in hardware, and another part of phase-locked loop circuit 500 is implemented in program code.

In this illustrative example, phase-locked loop circuit 500 includes multiplying digital-to-analog converter 502, filter 504, analog-to-digital converter 506, loop filter 508, voltage-controlled oscillator 510, and integrate-and-dump filter 512. Multiplying digital-to-analog converter 502 is a phase detector, such as phase detector 148 in FIG. 1 and phase detector 402 in FIG. 4. Multiplying digital-to-analog converter 502 is connected to loop filter 508 through filter 504 and analog-to-digital converter 506.

Loop filter 508, voltage-controlled oscillator 510, and integrate-and-dump filter 512 are implemented as program code running on micro controller 505. Micro controller 505 is an example of one implementation for first processor unit 110 in FIG. 1.

As depicted, multiplying digital-to-analog converter 502 receives signal 514 and signal 516 as inputs. Signal 514 is an electrical signal from an optical detector, such as first optical detector 112 in FIG. 1. In these illustrative examples, signal 514 is an example of electrical signals 144 in FIG. 1. Signal 516 is received from voltage-controlled oscillator 510.

In this depicted example, signal 514 has frames. Each frame has a first cycle with a frequency of about 15 hertz and 28 subsequent cycles with a frequency of about 30 cycles. In this manner, each frame is about one second long. Signal 516 has a frequency of about 30 hertz in this example. Signal 516 may take the form of, for example, signal 300 in FIG. 3.

Multiplying digital-to-analog converter 502 determines a phase difference between signal 514 and signal 516. In this illustrative example, at the beginning of a frame for signal 514, signal 514 and signal 516 are about 90 degrees out of phase. The output of multiplying digital-to-analog converter 502 is product signal 518. Product signal 518 is sent through filter 504.

In this illustrative example, filter 504 may be a low pass filter that allows frequencies under a selected frequency to pass. For example, filter 504 may be configured to allow frequencies under about 100 hertz to pass. Filter 504 sends filtered signal 520 to analog-to-digital converter 506. Analog-to-digital converter 506 converts filtered signal 520 into digital signal 522. Digital signal 522 is sent through loop filter 508.

Loop filter 508 is configured to allow a range of frequencies to pass. In this depicted example, this range of frequencies is selected to be substantially around a center of the frequency for signal 514. For example, the range of frequencies from about 29.5 hertz to about 30.5 hertz. This range has a center frequency of about 30 hertz. Further, this center frequency is the frequency to which phase-locked loop circuit 500 locks.

Phase-locked loop circuit 500 locks to this frequency by causing signal 516 to be substantially about 30 hertz. Several runs of phase-locked loop circuit 500 may be needed to lock to this frequency.

Loop filter 508 generates filtered signal 524 and sends filtered signal 524 to voltage-controlled oscillator 510. Filtered signal 524 may cause a change in the frequency of voltage-controlled oscillator 510. This change may be, for example, an increase or a decrease in the frequency for voltage-controlled oscillator 510. The change allows the frequency of voltage-controlled oscillator 510 to reach substantially the frequency of signal 514.

Digital signal 522 may also be sent from loop filter 508 to integrate-and-dump filter 512 in this illustrative example. Integrate-and-dump filter 512 adds together a plurality of samples for digital signal 522 over a selected period of time. This period of time is selected as the period of signal 516 that is output from voltage-controlled oscillator 510. In this illustrative example, the period is about one-thirtieth of a second.

Integrated signal 526 is output by integrate-and-dump filter 512 in the depicted example. Integrated signal 526 may be used by program code running on micro controller 505 to identify a beginning of a time interval during which an optical transmitter is to transmit an optical signal.

Figure 6:
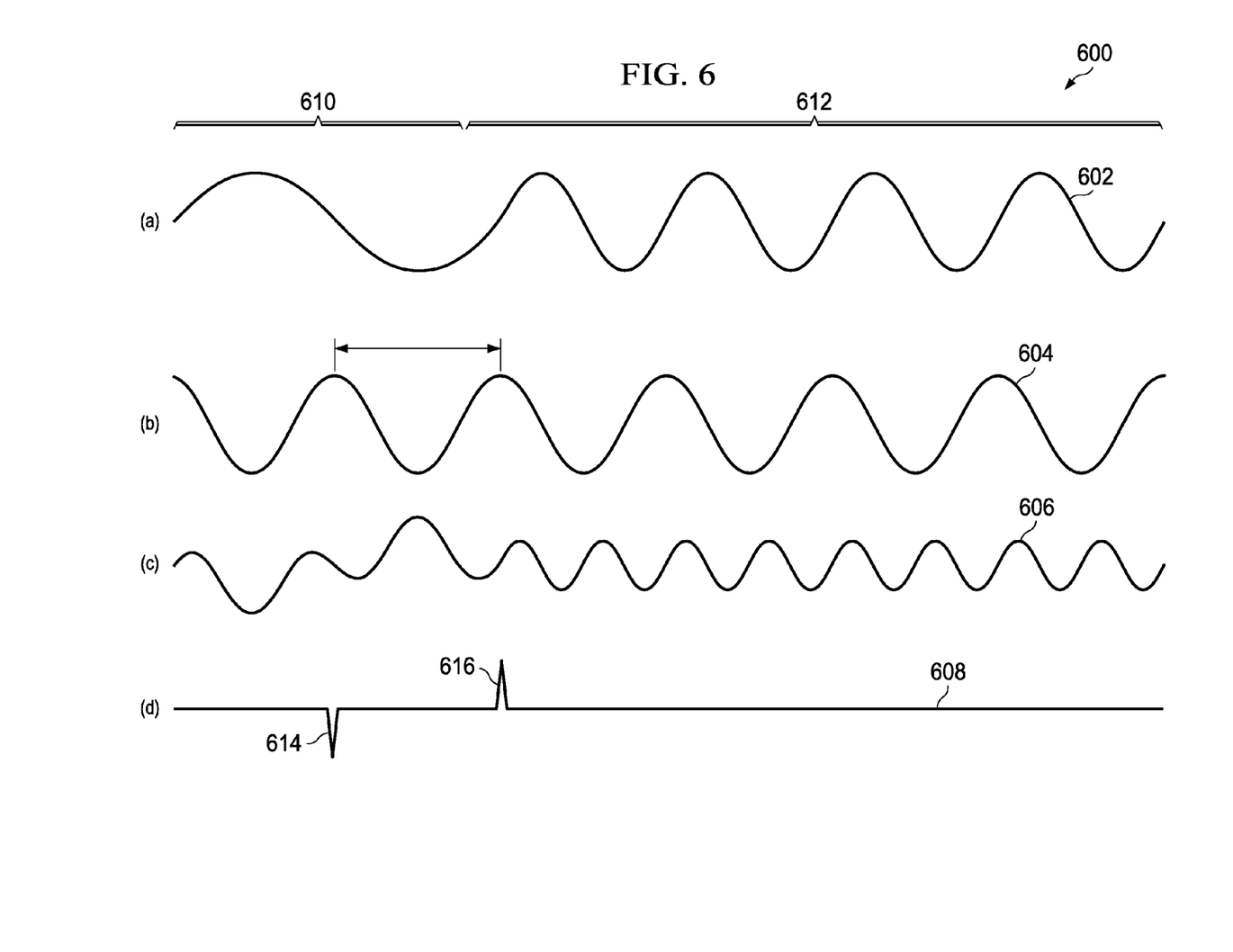
FIG. 6 is an illustration of signals in accordance with an advantageous embodiment.

With reference now to FIG. 6, an illustration of signals is depicted in accordance with an advantageous embodiment. In this illustrative example, signals 600 are examples of signals that may be identified in a phase-locked loop circuit. In particular, signals 600 are signals that may be identified in phase-locked loop circuit 500 in FIG. 5.

In this depicted example, signals 600 include signal 602, signal 604, signal 606, and signal 608. Signal 602 is signal 514 received from an optical detector in FIG. 5. As depicted, signal 602 has first cycle 610 and number of cycles 612. First cycle 610 has a frequency of about 15 hertz, and number of cycles 612 has a frequency of about 30 hertz in these examples.

Signal 604 is signal 516 output from voltage-controlled oscillator 510 in FIG. 5. As depicted, signal 604 has a frequency of about 30 hertz. Signal 606 is product signal 518 output from multiplying digital-to-analog converter 502 in FIG. 5.

Signal 608 is integrated signal 526 output by integrate-and-dump filter 512 in FIG. 5. As depicted, signal 608 has first spike 614 and second spike 616. First spike 614 and second spike 616 have opposite polarities in this illustrative example. Micro controller 505 in FIG. 5 may use first spike 614 and/or second spike 616 to identify a beginning of a time interval for an optical transmitter to transmit optical signals. In other words, the optical transmitter may transmit the optical signals during the time interval.

For example, second spike 616 may be used to identify the beginning of a time interval. At the beginning of the time interval, micro controller 505 may cause the optical transmitter to transmit the optical signals using a selected period of time. For example, the optical transmitter may be configured to transmit the optical signals about five milliseconds after the beginning of the time interval.

In some illustrative examples, an array of optical transmitters may be configured to transmit optical signals at selected time intervals. For example, second spike 616 may identify the beginning of a time interval during which a first optical transmitter is to transmit optical signals. A second optical transmitter and a third optical transmitter may be configured to transmit optical signals at one cycle and two cycles, respectively, after second spike 616, with respect to the cycles in signal 602.

Figure 7:
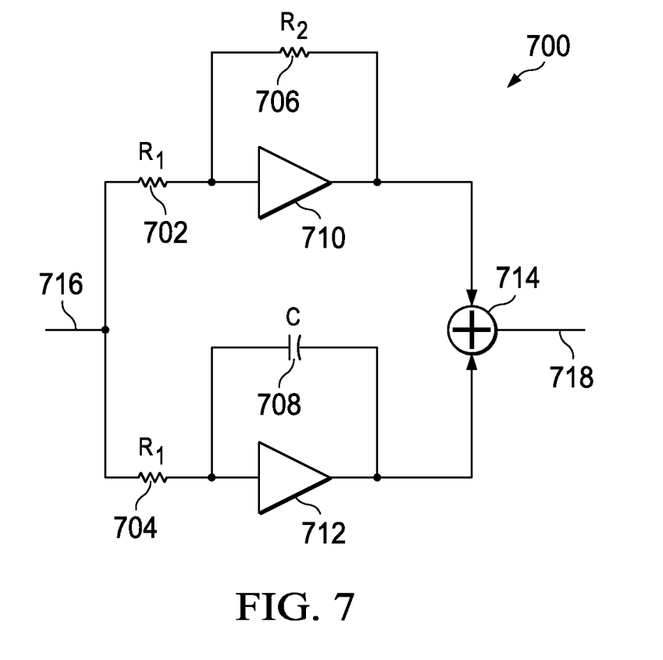
FIG. 7 is an illustration of a loop filter in accordance with an advantageous embodiment.

With reference now to FIG. 7, an illustration of a loop filter is depicted in accordance with an advantageous embodiment. In this illustrative example, loop filter 700 is an example of one implementation for loop filter 150 in FIG. 1 and loop filter 508 in FIG. 5.

As depicted, loop filter 700 includes resistor 702, resistor 704, resistor 706, capacitor 708, gain 710, gain 712, and adder 714. In this illustrative example, loop filter 700 receives signal 716 as input and sends signal 718 as output. Signal 716 is, for example, an electrical signal from an optical detector. Signal 718 may be sent to a voltage-controlled oscillator, such as voltage-controlled oscillator 510 in FIG. 5, and/or an integrate-and-dump filter, such as integrate-and-dump filter 512 in FIG. 5.

Figure 8:
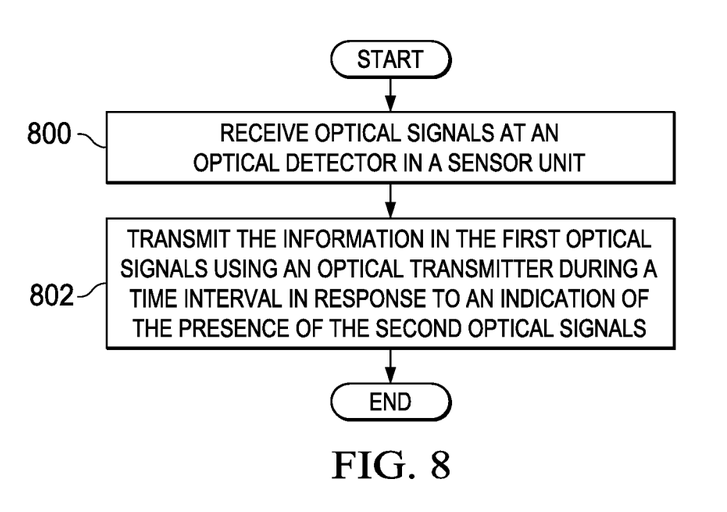
FIG. 8 is an illustration of a flowchart of a process for transmitting information in accordance with an advantageous embodiment.

With reference now to FIG. 8, an illustration of a flowchart of a process for transmitting information is depicted in accordance with an advantageous embodiment. The process illustrated in FIG. 8 may be implemented in optical communications environment 100 in FIG. 1 and in optical communications system 200 in FIG. 2.

The process begins by receiving optical signals at an optical detector in a sensor unit (operation 800). The sensor unit takes the form of, for example, sensor unit 107 in FIG. 1. Further, the optical detector may be, for example, first optical detector 112 in FIG. 1. The optical signals may be transmitted by a receiver system, such as receiver system 104.

The sensor unit comprises a platform, an optical transmitter associated with the platform, a sensor associated with the platform, a phase-locked loop circuit, and a processor unit associated with the platform. The processor unit is electrically connected to the optical detector, the optical transmitter, and the sensor. Further, the processor unit is associated with the phase-locked loop circuit.

In these illustrative examples, the optical transmitter is configured to transmit information in first optical signals. The phase-locked loop circuit is configured to indicate a presence of second optical signals in the optical signals received at the optical detector indicating a time interval to transmit the information.

The process then transmits the information in the first optical signals using an optical transmitter during a time interval in response to an indication of the presence of the second optical signals (operation 802), with the process terminating thereafter.

The flowchart and block diagrams in the different depicted embodiments illustrate the architecture, functionality, and operation of some possible implementations of apparatus and methods in different advantageous embodiments. In this regard, each block in the flowchart or block diagrams may represent a module, segment, function, and/or a portion of an operation or step. In some alternative implementations, the function or functions noted in the block may occur out of the order noted in the figures. For example, in some cases, two blocks shown in succession may be executed substantially concurrently, or the blocks may sometimes be executed in the reverse order, depending upon the functionality involved. Also, other blocks may be added in addition to the illustrated blocks in a flowchart or block diagram.

The description of the different advantageous embodiments has been presented for purposes of illustration and description and is not intended to be exhaustive or limited to the embodiments in the form disclosed. Many modifications and variations will be apparent to those of ordinary skill in the art. Further, different advantageous embodiments may provide different advantages as compared to other advantageous embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. An apparatus comprising:
    a first optical transmitter in a first platform, wherein the first optical transmitter is configured to transmit first optical signals;
    a first optical detector associated with the first platform, wherein the first optical detector is configured to receive optical signals comprising at least second optical signals, wherein the second optical signals comprise a one second beacon with a one fifteen Hertz sinewave followed by twenty-eight thirty Hertz sinewaves;
    a sensor associated with the first platform;
    a phase-locked loop circuit that locks onto the thirty Hertz sinewaves in the second optical signals, wherein the phase-locked loop circuit is configured to indicate a presence of the second optical signals in the optical signals indicating a time interval to transmit information in the first optical signals;
    a first processor unit associated with the first platform, wherein the first processor unit is electrically connected to the first optical detector, the first optical transmitter, and the sensor, wherein the first processor unit is associated with the phase-locked loop circuit, and wherein the first processor unit is configured to transmit the information in the first optical signals using the first optical transmitter during the time interval, the information comprising information from the sensor; and
    a receiver a second platform;
    a second optical detector associated with the second platform, wherein the second optical detector is configured to change the first optical signals into first electrical signals;
    a second optical transmitter associated with the second platform, wherein the second optical transmitter is configured to change second electrical signals into the second optical signals; and
    a second processor unit associated with the second platform, wherein the second processor unit is configured to transmit the second electrical signals indicating the time interval during which the information is transmitted by the sensor unit to the receiver.

2. The apparatus of claim 1, wherein the phase-locked loop circuit is connected to the first optical detector and is associated with the first processor unit.

3. The apparatus of claim 1, wherein the phase-locked loop circuit comprises:
    a phase detector having a first input connected to the optical detector;
    an oscillator having an output connected to a second input of the phase detector; and
    a loop filter having an input connected to an output of the phase detector and an output connected to the oscillator, wherein the loop filter is configured to pass a range of frequencies for the phase-locked loop circuit, wherein the range of frequencies is from about 29.5 Hertz to 30.5 Hertz.

4. The apparatus of claim 3, wherein the phase detector comprises a multiplying digital-to-analog converter and an output of the multiplying digital-to-analog converter is connected to the loop filter by a filter and an analog-to-digital converter.

5. The apparatus of claim 3, wherein the loop filter and the oscillator are implemented in program code configured to be run by the processor unit.

6. The apparatus of claim 3 further comprising:
    an integrate-and-dump filter connected to the phase detector and configured to add a plurality of samples over a selected period of time and indicate a beginning of the time interval, wherein the selected time period is about one-thirtieth of a second.

7. The apparatus of claim 1, wherein the first transmitter is selected from one of a light-emitting diode and a laser diode.

8. The apparatus of claim 1, wherein the sensor is selected from one of a temperature sensor, a pressure sensor, an accelerometer, a microphone, an oxygen sensor, a carbon dioxide sensor, a current sensor, a gas detector, an air flow sensor, a radiation detector, a tilt sensor, and a piezoelectric sensor.

9. The apparatus of claim 3, wherein the oscillator is selected from one of a voltage-controlled oscillator and a numerically-controlled oscillator.

10. An apparatus comprising:
    a number of sensor units, wherein a sensor unit within the number of sensor units comprises a first processor unit a first optical detector configured to receive optical signals a first optical transmitter configured to transmit first optical signals and a sensor, wherein the first processor unit is electrically connected to the first optical detector, the first optical transmitter, and the sensor, and wherein the first processor unit is configured to transmit the information in the first optical signals using the first optical transmitter during a time interval, wherein the first optical signals comprise a one second beacon with a one fifteen Hertz sinewave followed by twenty-eight thirty Hertz sinewaves; and a receiver system comprising, a second processor unit, a second optical detector, and a second optical transmitter, wherein the receiver system is configured to transmit second optical signals identifying a time interval during which information is transmitted by the number of sensor units and to receive the information in the first optical signals from the number of sensor units wherein the second optical signals comprise a one second beacon with a one fifteen Hertz sinewave followed by twenty-eight thirty Hertz sinewaves.

11. The apparatus of claim 10, wherein the sensor unit further comprises:
a phase-locked loop circuit that locks onto the thirty Hertz sinewaves in the second optical signals and that is configured to identify the time interval using the second optical signals indicating a presence of the time interval to transmit the information.

12. The apparatus of claim 11, wherein the phase-locked loop circuit comprises:
a phase detector having a first input connected to the first optical detector;
a voltage-controlled oscillator having an output connected to a second input of the phase detector; and
a loop filter having an input connected to an output of the phase detector and an output connected to the voltage-controlled oscillator, wherein the loop filter is configured to pass a range of frequencies for the phase-locked loop circuit, wherein the range of frequencies is from about 29.5 Hertz to 30.5 Hertz.

13. The apparatus of claim 12, wherein the phase detector comprises a multiplying digital-to-analog converter and an output of the multiplying digital-to-analog converter is connected to the loop filter by a filter and an analog-to-digital converter.

14. The apparatus of claim 12, wherein the loop filter and the voltage-controlled oscillator are implemented in program code configured to be run by the first processor unit.

15. The apparatus of claim 12 further comprising:
an integrate-and-dump filter connected to the phase detector and configured to add a plurality of samples over a selected period of time and indicate a beginning of the time interval, where the selected time period is about one-thirtieth of a second.

16. A method for transmitting information, the method comprising:
receiving optical signals at a first optical detector in a sensor unit, wherein the sensor unit comprises a first optical transmitter configured to transmit the information in first optical signals, a sensor, a phase-locked loop circuit, and a first processor unit electrically connected to the optical detector, the optical transmitter, and the sensor and in which the processor unit is connected to the phase-locked loop circuit; and wherein the phase-locked loop circuit is configured to indicate a presence of second optical signals in the optical signals indicating a time interval to transmit the information, wherein the first optical signals and the second optical signals each comprise a one second beacon with a one fifteen Hertz sinewave followed by twenty-eight thirty Hertz sinewaves;
responsive to an indication of the presence of the second optical signals, transmitting the information in the first optical signals using the optical transmitter during the time interval; and
sending the second optical signals, by a receiver system, to the sensor unit, wherein the receiver system comprises a second optical detector configured to change the first optical signals into first electrical signals a second optical transmitter, wherein the second optical transmitter is configured to change second electrical signals into the second optical signals, and a processor unit configured to transmit the second electrical signals indicating the time interval during which the information is transmitted by the sensor unit to the receiver system.

17. The method of claim 16, wherein the phase-locked loop circuit comprises a phase detector having a first input connected to the optical detector; a voltage-controlled oscillator having an output connected to a second input of the phase detector; and a loop filter having an input connected to an output of the phase detector and an output connected to the voltage-controlled oscillator, wherein the loop filter is configured to pass a range of frequencies for the phase-locked loop circuit, wherein the range of frequencies is from about 29.5 Hertz to about 30.5 Hertz.

18. The method of claim 17, further comprising:
changing, by the optical detector, the optical signals into electrical signals;
generating, by the phase detector, a product signal identifying a phase difference between the electrical signals and a signal generated by the voltage-controlled oscillator;
filtering, by the loop filter, the product signal to pass the range of frequencies; and
changing a frequency for the voltage-controlled oscillator to substantially match a frequency for the second optical signals in the time interval.

* * * * *